INVENTORS
Onni Lindfors
Wallace E. Johnson
BY
Fidler, Beardsley & Bradley
ATTORNEYS

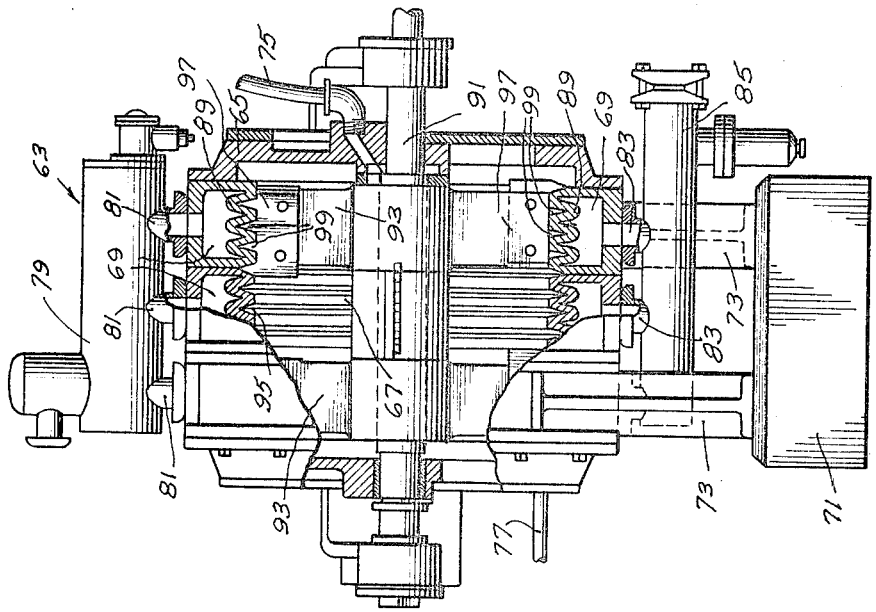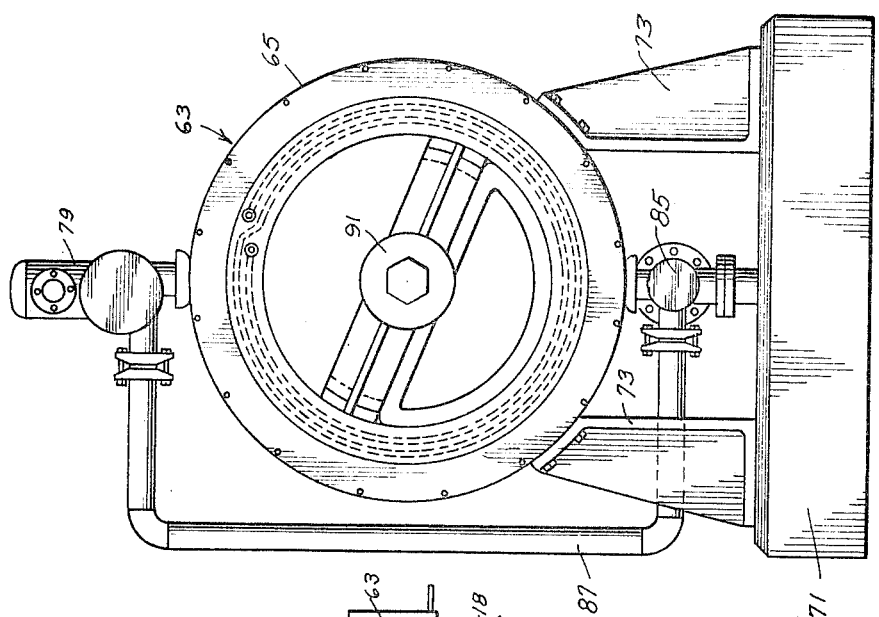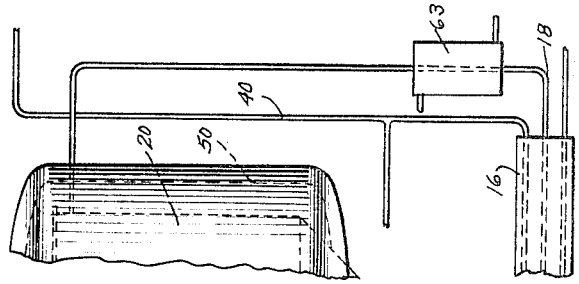

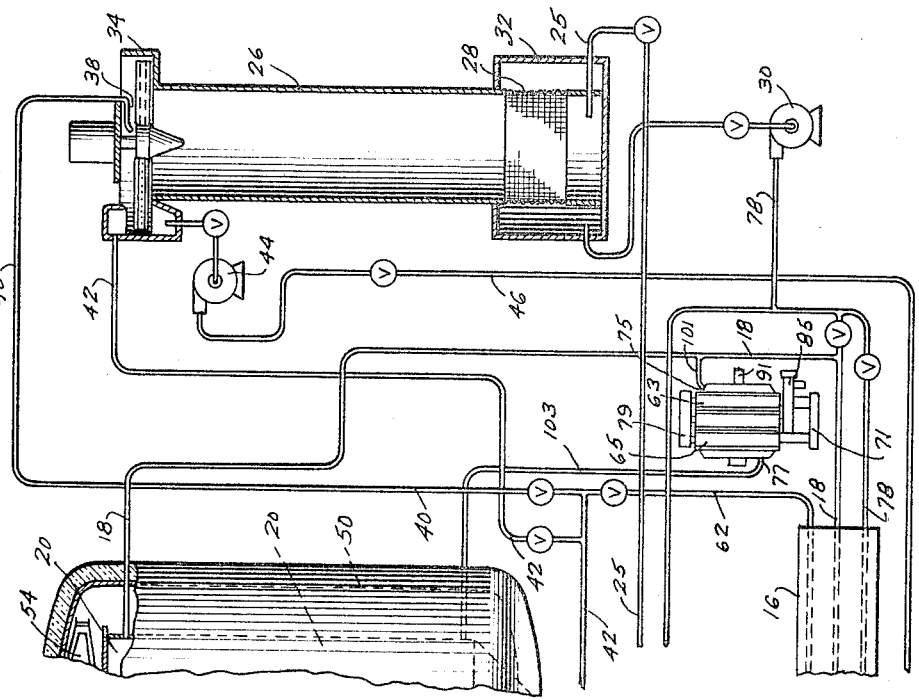
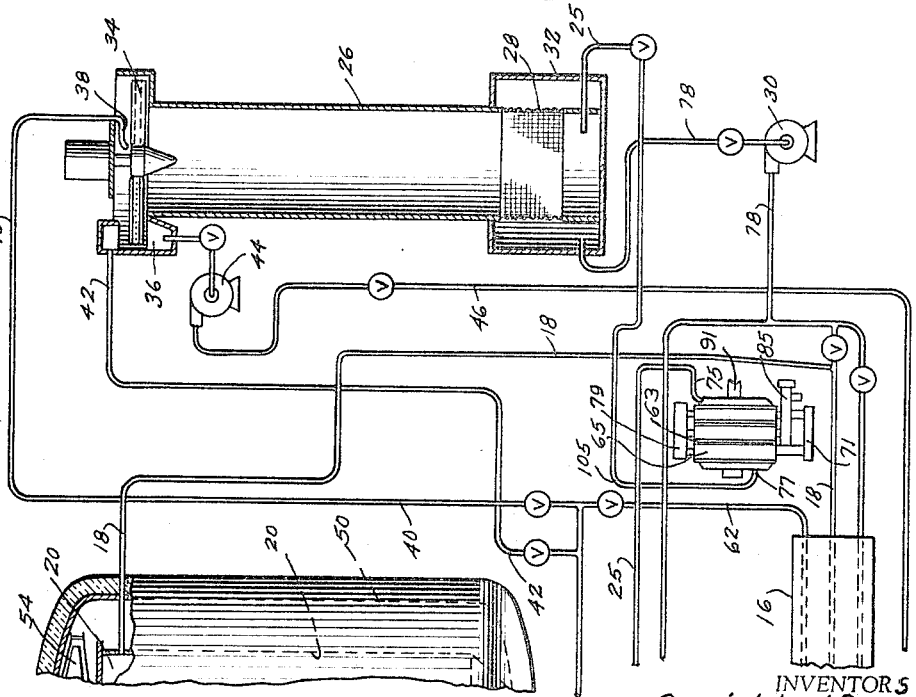

United States Patent Office 3,269,134
Patented August 30, 1966

3,269,134
SEPARATING A SOLVENT FROM SOLUTION IN INDIRECT AND DIRECT FREEZE UNITS
Onni Lindfors and Wallace E. Johnson, Beloit, Wis., assignors to Desalination Plants (Developers of Zarchin Process) Limited, Tel Aviv, Israel, a limited company of Israel
Filed May 16, 1962, Ser. No. 195,083
10 Claims. (Cl. 62—58)

This invention relates to separation of a solute in substantially pure form from a solution, and is more particularly directed to new and improved processes, apparatus and systems utilizing freezing of the solute.

In direct freezing systems for separating a solute in substantially pure form from a solution, for example, a flash-evaporative type desalination system for producing potable water from sea water, a large quantity of vapor is produced. Normally, the vapor is thereafter to be condensed to produce solute in substantially pure form which may be either the desired final product, for example, in desalination systems, potable or "sweet" water, or a byproduct, such as in fruit juice dehydration systems.

In certain types of solute separating systems involving direct freezing of the solute, for example, in flash-evaporative type desalination systems wherein sea water is flash-evaporated in a direct freezing zone to produce vapor and ice, a quantity of ice crystals is also produced from the sea water in the direct freezing zone in addition to the vapor produced therein. These ice crystals have salt occluded both in the interstices and on the surfaces thereof. The ice crystals so formed are then separated from the vapor and the occluded salt washed from the ice crystals.

In some separating systems of this type, the washed ice and vapor are then contacted in a condensing zone to condense the vapor and melt the ice to produce a liquid as one of the final products, which in desalination systems is the desired final product, potable or "sweet" water.

Condensation of the vapor, therefore, is a design parameter for any such direct freezing solute separating system. Inherently, however, the quantity of vapor produced from the solute in the direct freezing zone is in excess of the quantity of vapor desired to result in ideal thermal balance conditions between the vapor and the ice contacted in the condensing zone. In other words, in those systems where the ice and vapor are contacted in a condensing zone, the quantity of ice produced in the direct freezing zone per quantity of vapor so produced is less than the quantity of ice required to condense the quantity of vapor so produced and to melt that quantity of ice in the condensing zone.

Ideal thermal balance conditions between the ice and the vapor in the condensing zone are not achievable with direct freezing solute separating systems of this type not only because of the stoichiometric inequality of ice and vapor produced in the direct freezing zone, but also because of system heat losses which increase the total quantity of vapor produced in the separating system, and thereby adds to the vapor condensation problem. Moreover, in direct freezing solute separating systems employing heat producing components such as heat exchangers and a compressor to move the vapor from the freezing zone to the condensing zone to produce the final product, heating of the vapor by the heat exchanger and compressor occurs, and it will be appreciated that such heating will also increase the total quantity of heat introduced into the system and thereby add to the vapor condensation problem.

Thus, particularly in those direct freezing systems for producing solute in substantially pure form where ice crystals are produced by direct freezing of the solute in a direct freezing zone and the thus produced ice and vapor are thereafter contacted in a condensing zone for condensation of the vapor and melting of the ice to produce the final product, the stoichiometric quantities of ice so produced are insufficient to adequately handle condensation of all the thus produced vapor in the condensing zone not only because the original thermal unbalance conditions involved in the formation of the ice and vapor in the direct freezing zone produce an excess of vapor but also because of the increase attributable to system heat gains in the quantity of excess vapor required to be condensed in the condensing zone by the ice.

Included among prior attempts to establish, in such systems, commercially efficient thermal balance conditions between the ice and the vapor in the condensing zone, i.e., attempts to remedy the excess vapor problem, have been those of (1) bypassing a portion of the vapor from the freezing zone or from the condensing zone and (2) employment of auxiliary refrigeration equipment in the condensing zone. Each of these attempts, however, although each attempt has been successful to an extent for some applications, has certain inherent disadvantages in its utilization for such purposes. For example, bypassing of excess vapors from the condensing zone involves accurate control of removal of vapor, so that the desired quantity of vapor remains and is available for the formation of the final product in the condensing zone, and employment of auxiliary refrigeration equipment usually involves positioning of refrigeration coils in the condensing zone on which ice may form to an extent sufficient to block flow of the final product from the condensing zone, particularly in those systems in which the condensing zone comprises a vertical tower into which the vapor is introduced from the top thereof.

With the present invention, the problems and difficulties of the prior art are substantially overcome by the provision of a direct freezing system for separating a solute in substantially pure form from a solution wherein heat is removed from the system by producing ice crystals either in a pre-icing zone from a portion of the solute preferably without the production of vapor, or with the production of a minimum amount of vapor, prior to the introduction of the solute into a direct freezing zone to form ice crystals and vapor, and wherein the vapor is thereafter contacted with the ice so produced in a condensing zone to condense the vapor and to melt the ice, or by producing ice crystals in the brine discharge line of the direct freezing zone supplying brine to a device in which the system ice is separated from the remaining brine and from which the thus separated ice is circulated to a vapor condensing zone to condense the vapor and melt the ice.

By so producing ice crystals from the solute before introduction of the solute into the direct freezing zone either in the sea water line leading to the direct freezing zone or in the brine discharge line of the direct freezing zone, the quantity of solute in the solution thereafter available for the production of ice crystals in the direct freezing zone will be reduced and, consequently, the amount of vapor producible from the solute in the direct freezing zone to be condensed by the ice in the condensing zone will be proportionately reduced. Thus, with the present invention, commercially practicable thermal balance conditions in the condensing zone are approached in removing heat from the system by producing ice, particularly in those separating systems of the type wherein the ice crystals and vapor produced in the direct freezing zone are separated, the ice crystals washed, and the washed ice and vapor subsequently contacted in a condensing zone to condense the vapor and melt the ice to produce the final product, which, for example, in a direct freezing desalination system of the flash-evaporative type, would be potable or "sweet" water.

It will be appreciated in the practice of the present invention excess heat is removed from the system by producing ice and that the present invention is thus concerned with removing heat from the system rather than merely transferring heat within the system. The ice crystals produced by removing heat from the system before introduction of the ice crystals into the direct freezing zone in accordance with the present invention are inert with respect to the solution, and thus according to one aspect of this invention, may be mixed with the solution, and this mixture of ice and solution may then be supplied to the direct freezing zone to form ice crystals and vapor from the solute. The ice crystals in the mixture of ice and solute have a tendency to chill and pre-cool the solute in the mixture to thereby condition the solute for flash evaporation thereof before introduction of the mixture into the direct freezing zone. Moreover, the ice crystals in the mixture of ice and solute tend to serve as seed crystals to promote and enhance formation of ice crystals from the solute in the direct freezing zone. It will be appreciated also that these seed crystals in the mixture thereby tend further to serve to reduce the amount of vapor formed in the direct freezing zone and thus the amount of vapor to be condensed in the condensing zone by the ice.

If the ice crystals so formed before introduction of the sea water into the direct freezing zone are mixed with the solution, this mixture may then be supplied to the direct freezing zone to produce ice and vapor from the solute. If the ice component and vapor are removed from the direct freezing zone, the vapor is then separated from the ice component and washed, and the washed ice then employed in a condensing zone to condense the vapor produced in the freezing zone and melt the ice to produce the final product, it will be appreciated that, in accordance with the present invention, the quantity of ice available for condensation of the vapor in the condensing zone will be greater than the quantity of ice which would otherwise be available for this purpose, if ice were not formed from a portion of the solute prior to its introduction into the direct freezing zone. Thus, ideal thermal balance conditions between the ice and vapor in the condensing zone are approached with the present invention not only by an increase in ice content caused by removal of heat from the system and an attendant reduction in the amount of solute available for the production of vapor in the direct freezing zone, but also by an increase in the total quantity of ice produced by the system, so that, after contact of vapor and ice in the condensing zone, the quantity of final product produced by the system is greater than the quantity that would be produced in a comparable system in which ice is not produced by removal of heat from the system either before introduction of the solution into a direct freezing zone or before introduction of the brine into the brine and ice separator prior to circulation of the ice to the condensing zone.

Because, as aforesaid, the ice is inert with respect to the solution, the ice may be produced to remove heat from the system from the ice-brine mixture discharged from the freezing zone if the brine is to be separated from the ice in a brine-ice separator prior to introduction of the mixture into the separator. The ice crystals thus produced are combined in the separator with the ice produced in the direct freezing zone from the remainder of the solution before washing thereof to remove occluded substances from the ice, and the combined ice, after washing thereof, introduced into the condensing zone for condensation of the vapor produced in the freezing zone and for melting of the ice to produce the final product, which, in desalination systems, would be potable or "sweet" water.

By employment of either of the system variations set forth above, the above-mentioned advantages of excess heat removal, a reduction in the amount of excess vapor produced by the system, and an increase in the total quantity of system final product are achieved.

It will be observed that in the description herein of the means or steps of producing ice crystals from a portion of the solute in a pre-icing zone before introduction thereof into the direct freezing zone, reference is had to the system requirement that the ice crystals should be formed from the solute in the pre-icing zone with the attendant production of a minimum amount of vapor or, preferably without the formation of vapor. It is, therefore, preferable to employ indirect freezing means for producing the ice crystals from the solute in the pre-icing zone. Therefore, the phrases "indirect freezing means," "indirect freezing," "indirect freezing zone" and "pre-icing zone," as used herein in connection with the description of processes, apparatus and systems of the present invention are intended to refer to the production of ice crystals from the solute prior to introduction thereof into the direct freezing zone accompanied by the production of only a minimum amount of vapor or preferably without the production of vapor. The phrases "indirect freezing means," "indirect freezing," "indirect freezing zone" and "pre-icing zone," may include freezing means comprising refrigeration coils in contact with the solute or substances, such as Freon, butane or isobutane, which, when brought in intimate direct contact with the solute as a refrigerant, produce ice crystals of the solute, the refrigerant being thereafter removed before introduction of the ice crystals into the remainder of the system for producing a solute in substantially pure form from the solution.

As used herein in connection with systems, apparatus and processes of the present invention, the phrases "direct freezing" and "direct freezing zone" are intended to refer to the production of both vapor and ice crystals from the solute. These latter phrases are, therefore, intended to include within the scope thereof all such systems, apparatus and processes in which ice and vapor are formed of the solute.

It is, therefore, an object of the present invention to provide new and improved processes, apparatus and systems for separating a solute in substantially pure form from a solution.

Another object of the present invention is to provide new and improved processes, apparatus and systems for separating a solute in substantially pure form from a solution wherein heat is removed from the processes, apparatus and systems by producing ice.

Another object of the present invention is to provide new and improved processes, apparatus and systems for separating a solute in substantially pure form from a solution wherein vapor produced by freezing of the solute to form ice crystals is efficiently utilized in the system, and wherein the quantity of vapor so produced are efficiently controlled.

Still another object of the present invention is to provide new and improved processes, apparatus and systems for separating a solute in substantially pure form from a solution in which ice crystals are formed from the solute with an attendant minimum production of vapor or without the production of vapor before ice crystals and vapor are formed of the remainder of the solute.

A further object of the present invention is to provide processes, apparatus and systems for separating a solute in substantially pure form from a solution wherein ice crystals are formed from a portion of the solute without the production of vapor, or with the production of a minimum amount of vapor, in a pre-icing zone before introduction of the remainder of the solute into a direct freezing zone for the production of ice crystals and vapor therefrom, and wherein the vapor so produced is subsequently condensed in a condensing zone.

A still further object of the present invention is to provide processes, apparatus and systems for separating a solute in substantially pure form from a solution wherein ice crystals are formed from a portion of the solute without the production of vapor, or with the production of a minimum amount of vapor, in a pre-icing zone before introduction of the remainder of the solute into a direct freezing zone for the production of ice crystals and vapor therefrom, and wherein the vapor and ice so produced are separated, and thereafter the ice and vapor are contacted in a condensing zone for condensing of the vapor and melting of the ice.

Another object of the present invention is to provide processes, apparatus and systems for separating a solute in substantially pure form from a solution wherein ice crystals are formed from a portion of the solute without the production of vapor, or with the production of a minimum amount of vapor, in a pre-icing zone before introduction of the remainder of the solute into a direct freezing zone for the production of ice crystals and vapor therefrom, and wherein the ice crystals in the pre-icing zone are mixed with the ice produced in the direct freezing zone after separation thereof from the vapor, and the resulting mixture of ice is thereafter contacted with the vapor in a condensing zone to condense the vapor and melt the ice.

Still another object of the present invention is to provide processes, apparatus and systems for separating a solute in substantially pure form from a solution wherein ice crystals are formed from a portion of the solute without the production of vapor, or with the production of a minimum amount of vapor, in a pre-icing zone before introduction of the remainder of the solute into a direct freezing zone for the production of ice crystals and vapor therefrom, and wherein the ice produced in the pre-icing zone is mixed with the remainder of the solute, thereafter ice crystals and vapor are produced from the solute in the direct freezing zone, the ice and vapor then separated, and the ice and vapor thereafter contacted in a condensing zone to condense the vapor and to melt the ice.

A further object of the present invention is to provide processes, apparatus and systems for separating a solute in substantially pure form from a solution wherein ice crystals are formed from a portion of the solute without the production of vapor, or with the production of a minimum amount of vapor, in a pre-icing zone before introduction of the remainder of the solute into a direct freezing zone for the production of ice crystals and vapor therefrom, and wherein the ice crystals and the remainder of the solute are separated, ice and vapor are produced from the remainder of the solute in a direct freezing zone, the ice and vapor produced in the direct freezing zone are separated, the ice crystals produced in the pre-icing zone are then mixed with the ice produced in the direct freezing zone, and the mixture of ice and the vapor are thereafter contacted in a condensing zone for condensation of the vapor and melting of the ice.

A further object of the present invention is to provide processes, apparatus and systems for separating a solute in substantially pure form from a solution wherein ice crystals are formed from a portion of the solute without the production of vapor, or with the production of a minimum amount of vapor, in a pre-icing zone before introduction of the remainder of the solute into a direct freezing zone for the production of ice crystals and vapor therefrom, and wherein the ice crystals and the remainder of the solute are separated, ice and vapor produced from the remainder of the solute in a direct freezing zone, the ice and vapor produced in the direct freezing zone are separated, the ice crystals produced in the pre-icing zone are then mixed with the ice produced in the direct freezing zone, the mixture of ice is then washed, and the washed ice and vapor are thereafter contacted in a condensing zone for condensation of the vapor and melting of the ice.

Another object of the present invention is to provide processes, apparatus and systems for separating a solute in substantially pure form from a solution wherein ice crystals are formed from a portion of the solute without the production of vapor, or with the production of a minimum amount of vapor, in a pre-icing zone before introduction of the remainder of the solute into a direct freezing zone for the production of ice crystals and vapor therefrom, said direct freezing zone being at low temperature and sub-atmospheric pressure, and wherein the vapor and ice so produced are separated, and the vapor and ice moved from the low pressure direct freezing zone into a condensing zone of at least atmospheric pressure for contact of the ice and vapor to condense the vapor and melt the ice.

A further object of the present invention is to provide a desalination system in which sea water is flash-evaporated to form ice crystals and vapor and in which ice crystals are produced with the attendant production of a minimum amount of vapor, or without the production of vapor, from a portion of the sea water before the sea water is flash-evaporated so that the amount of vapor formed by flash-evaporation of the solute thereafter may be controlled.

A still further object of the present invention is to provide a direct freezing desalination system wherein sea water is flash-evaporated to form ice crystals and vapor, and wherein ice crystals are formed from a portion of the sea water to remove heat before the sea water is flash-evaporated to produce ice crystals which are efficiently utilized thereafter in the system.

Another object of the present invention is to provide a flash-evaporative type desalination system in which ice crystals are formed from a portion of the incoming sea water to thereby reduce the quantity of sea water remaining from which vapor may be produced by subsequent flash-evaporation of the sea water.

Another object of the present invention is to provide direct freezing desalination apparatus including means for introducing sea water into a pre-icing zone, means in the zone for producing ice crystals from a portion of the sea water without producing a large quantity of vapor, means for introducing the remainder of the sea water into a direct freezing zone for producing ice crystals and vapor therefrom, means for removing the ice crystals and vapor from the direct freezing zone, means for separating the vapor and ice crystals, and means for contacting the vapor and ice in a condensing zone for condensation of the vapor and melting of the ice.

Still another object of the present invention is to provide desalination apparatus including first means for producing ice crystals and vapor in a direct freezing zone, means to separate the ice crystals and the vapor, means to move the ice crystals to a vapor condensing zone, means to move the vapor to the vapor condensing zone for condensing thereof on said ice, and means for producing ice from a portion of the sea water in a pre-icing zone, before the sea water is introduced into said direct freezing zone, to form ice crystals and thereby increase the quantity of ice produced by the apparatus, said latter ice crystals being mixed with the sea water before introduction thereof into the direct freezing zone to chill the sea water and to serve as seed crystals in said direct freezing zone to promote ice formation therein.

A further object of the present invention is to provide a direct freezing desalination system in which a portion of the incoming sea water is converted to ice, and the mixture of ice and sea water is then moved into a direct freezing zone of the sea water to produce ice and vapor for the sea water.

Another object of the present invention is to provide a desalination system in which sea water is converted into ice, brine and vapor, the brine separated from the ice, the brine converted to a mixture of ice and brine, the mixture mixed with ice, the brine separated from the ice, and the ice thereafter contacted with the vapor to melt the ice and condense the vapor.

Yet another object of the present invention is to provide new and improved methods for separating a solute in substantially pure form from a solution by removing heat from the solution by producing ice.

Still another object of the present invention is to provide new and improved methods of producing potable water from sea water wherein portion of the sea water in indirectly frozen to remove heat and to produce ice crystals, the sea water in the mixture of sea water and ice crystals thus produced is thereafter directly frozen to produce ice crystals and vapor, the ice crystals and vapor are separated, the ice washed and the vapor thereafter brought in contact with the ice for condensation thereof and melting of the ice to produce fresh or "sweet" water.

These and other objects, features and advantages of the present invention will become readily apparent to those skilled in the art from a careful consideration of the following detailed description, when considered in conjunction with the accompanying drawings, illustrating preferred embodiments of the present invention, wherein like reference numerals and characters refer to like and corresponding parts throughout the several views, and wherein:

FIG. 2 is a generally diagrammatic view of means of FIG. 1 for producing ice from a portion of the pre-cooled incoming sea water.

FIG. 3 is an enlarged view in partial section of means for producing ice from a portion of the incoming sea water in the system illustrated in FIG. 1.

FIG. 4 is an end view in elevation of the means of FIG. 3 taken along line 4—4 of FIG. 3.

Figure 1:
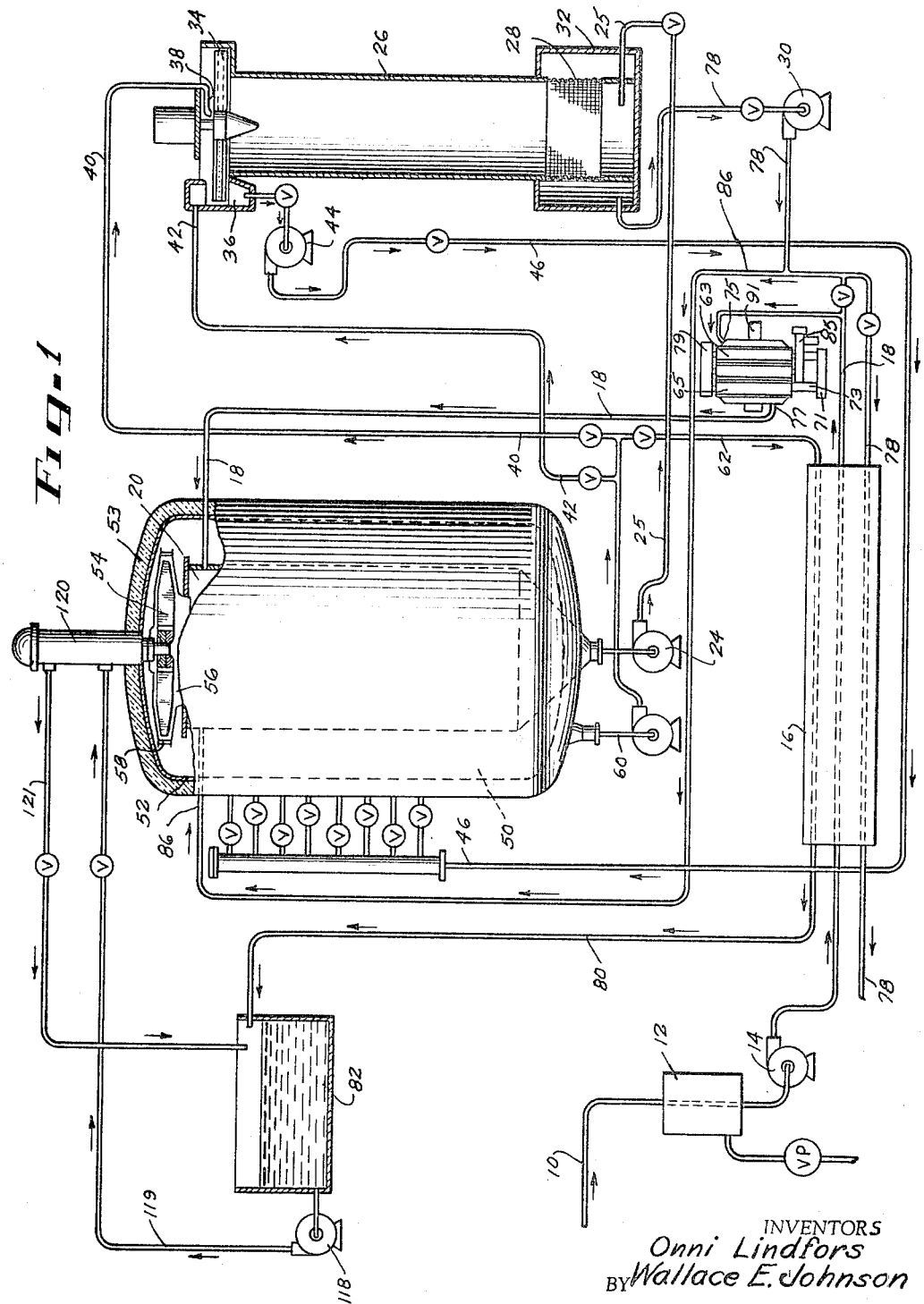
FIG. 1 is a schematic layout of a desalination system embodying the principles of the present invention.

FIG. 5 is an alternate embodiment of the system of FIG. 1 in which the ice formed from the portion of the incoming sea water is by-passed into the bottom of the evaporating chamber, and FIG. 6 is a generally schematic view illustrating an alternative embodiment of the present invention wherein ice is formed from a portion of the brine supplied from the evaporating chamber into a brine-ice separator and counter-washer.

General description of the system

Although the present invention has a variety of applications, the principles of the present invention described herein are shown as applied to a direct freezing system for producing potable water from sea water by flash evaporation of the sea water to form vapor and ice. The general layout of a preferred system appears in FIG. 1.

Sea water, which is at ambient temperature, and which has been pre-filtered to remove floating material and other solids, is brought into the system through a sea water inlet pipe 10 and passed through a de-aerator 12 where dissolved gas is removed from the sea water. The sea water is then delivered by a pump 14 to a heat exchanger 16, where the incoming sea water is placed in heat-exchange relationship with the potable water final product and with concentrated brine both of which fluids are being withdrawn from the system.

The sea water entering the system will be normally at ambient temperature, such as, for example, 77° F. and will normally contain about 3.5% by weight of salt, the salinity of the sea water depending upon the geographical location from which the sea water is extracted.

As hereinafter described, the sea water leaving the heat exchanger 16 will be at a temperature of approximately 30.2° F. and is then delivered through a pipe 18 into a direct freezing zone which comprises an evaporating chamber 20 illustrated by the dotted lines. The sea water enters the evaporating chamber 20 near the top thereof, and the sea water, upon entering the evaporating chamber 20, thereafter flows downwardly, preferably over distributor means (not shown) so that the incoming sea water has a large surface exposure for evaporation in the evaporating chamber 20.

The interior of the evaporating chamber 20 is maintained at a low pressure, approximately 3.2 mm. Hg (millimeters of mercury) by a vacuum pump (not shown).

Due to the fact that the interior of the evaporating chamber 20 is at such low pressure, sea water will flash-evaporate therein. At the freezing temperature of sea water, the heat of vaporization is approximately 1074 b.t.u. per pound and the heat of fusion of ice is about 144 b.t.u. per pound. As vapor is produced by vaporization, heat is removed from the remaining sea water, and ice is formed from this sea water. Due to the differences in heat of vaporization and heat of fusion, approximately 7½ pounds of ice will be produced for each pound of water vapor. The ice so produced is substantially pure water ice with no appreciable amount of salt contained therein. When continuous operation of the system is established, the temperature within the evaporating chamber will be approximately 24.8° F. The vapor formed will be pure water vapor. Thus, upon removal of the pure water from the incoming sea water by the vaporizing and freezing, the remaining sea water becomes a more concentrated salt solution.

While theoretically an excess of 75% pure water by weight could be removed in the form of vapor and ice, we have found that removing approximately 50% by weight of pure water is in the range of greatest efficiency; thus, if approximately 50% of the water is removed as vapor and ice, the remaining brine solution will consist of approximately 7% by weight of salt.

It will be appreciated that the vaporization of water, with the consequent formation of vapor and ice, is a function of time since heat must be transferred, and, since also the rate of evaporation is proportional to surface area, that in order to have the sea water remain in the evaporating chamber 20 for a sufficient period of time to form vapor and ice and to offer large surface exposure of the sea water, distributor means (not shown) should be disposed within the evaporating chamber 20. A suitable distributing means is described in detail in the co-pending United States application for patent of John Hans Davids, Serial No. 85,522, filed January 30, 1961 for "Means for Freezing Exposure of Salt Water in a Salt Water Purification System," the disclosure of which is hereby incorporated herein by reference.

The mixture of brine with the ice crystals therein is withdrawn from the bottom of the evaporating chamber 20 through a pump 24, and this mixture of brine and ice crystals has a temperature of approximately 24.8° F.

This mixture of brine and ice crystals is then delivered to a separtaor-washer or counter-washer 26, in which the ice is separated from the concentrated brine and the ice is washed free of occluded salt and salt adhering to the surface of the ice crystals. The ice-brine mixture enters the lower end of the separator-washer 26 under pressure and the column of the separator-washer 26 becomes essentially full of ice crystals.

The pressure exerted by the entrance of the mixture at the bottom of the counter-washer 26 forces the cylinder of ice packed therein upwardly, and the brine forces its way through the ice pack, out through an annular screen 28. A pump 30 removes the brine from an annular jacket 32 around the lower end of the counter-washer 26. The pressure drop, created by forcing brine through the ice pack within the column, exerts a great force on the column of packed ice which moves the column of packed ice upwardly. Thus, the column of packed ice within the counter-washer 26 continuously moves upwardly. At the upper end of the counter-washer is a motor-driven scraper or wiper 34 which wipes off the top of the upwardly moving column of ice and delivers the ice into a vacuum trough 36. Spray heads 38 are provided at the top of the counter-washer 26 for spraying "sweet" water supplied by pipe 40 onto the top of the porous column of ice, which water runs downwardly over the advancing column of ice to wash any adhering or occluded brine from the surface and from the interstices of the ice.

"Sweet" water is added by means of pipe 42 to the ice in the trough 36 so as to produce a solution of "sweet"

water and ice suspended therein which can be pumped. The ice is introduced into the vacuum chamber 36 by supplying "sweet" water to the ice to provide a liquid with the ice suspended therein, the resulting mixture may, therefore, be more readily handled, and the "sweet" water prevents the breaking of the vacuum within the vacuum chamber 36. A pump 44 is shown for delivering the mixture of ice and "sweet" water through a pipe 46 to a vapor condensing zone which comprises a vapor condensing chamber 50.

The condensing chamber 50 is an annular chamber, having its inner dimension defined by the wall of the concentric evaporating chamber 20 and its outer dimension defined by an outer wall 52 which preferably is insulated as indicated at 53 in FIG. 1 to prevent heat from entering the system.

A plurality of trays (not shown) arranged concentrically within the condensing chamber 50 may be provided for receiving the mixture of ice and "sweet" water. chamber 50 and is provided with an axial intake opening 56 in communication with the evaporating chamber 20 and with a circular outlet 58 communicating with the condensing chamber 50.

Vapor formed in the evaporating chamber 20 is drawn into the central intake opening 56 of the compressor 54 and delivered radially outward into the condensing chamber 50 through the outlet 58. The vapor is thus compressed and the compressor 54 maintains the condensing chamber 50 at a pressure of approximately 4.6 mm. Hg. The vapor delivered by the compressor into the condensing chamber passes downwardly into contact with the ice disposed in the condensing chamber 50 and simultaneously causes the vapor to condense and the ice to melt. The "sweet" water thus produced is withdrawn from the lower end of the condensing chamber 50 through a pipe 60, which delivers a portion of the "sweet" water back to the counter-washer 26 through pipes 40 and 42 for ice washing and for mixing with the ice. The major quantity of the "sweet" water product passes through the pipe 62 to the heat exchanger 16.

One of the greatest difficulties encountered in prior art vacuum freezing systems is their inability to efficiently and economically handle and transport the large volumes of vapor that exists for any system produced in a meaningful amount of "sweet" water, particularly when it is recognized that we are dealing with such low pressures that approximately 4500 cubic feet of vapor at these pressures is required to provide one pound of water vapor. Without the arrangement, systems and methods of the present invention, expensive and extremely large compressor shrouds and conduits would be required for transporting the vapor. Normally, to move any such large volume, a multi-stage axial compressor would be required, and this, alone, without considering the conduit and its size and expense, would make the system uneconomical.

Ideally, the vapor should be delivered to the condensing chamber at saturation conditions of pressure and temperature so that the vapor will condense on the 32° F. ice, and the ice will take out of the vapor 1074 B.t.u. per pound A compressor 54, which may be a radial compressor, is positioned within the upper end of the condensing of vapor condensed and thereby cause the 32° F. ice to melt by each pound of ice absorbing 144 B.t.u. However, due to losses because of heat entering the system and heating of the vapor by the compressor, the excess vapor in the system is not condensed to provide ideal thermal balance conditions in the condensing chamber and thus some means must be provided for removing this excess vapor from the system. The provision of secondary refrigeration coils in the evaporating chamber to cause formation of additional ice therein will not adequately solve this problem, since a disadvantage inherent in the employment of such secondary refrigeration coils in the evaporating chamber 20 is that additional surfaces are provided in the evaporating chamber 20 on which ice may collect and form. To eliminate the formation of ice on the coils, either the number of coils used must be large or the temperature of the evaporating chamber must be larger than the most efficient and practical temperature possible. These two solutions introduce inefficiencies into the system which are avoided by the present invention. The ice so formed in the bottom of the condensing chamber may collect to an extent sufficient to cause interruption of the continuous process of the system. Moreover, employment of such refrigeration coils in the evaporating chamber 20 will not solve completely the excess vapor problem caused by system heat gains including heating of the vapor in the compressor 54.

For example, secondary refrigeration coils may be shown disposed in the condensing chamber 50 for condensing excess vapor in the condensing chamber. However, even with the arrangement described in this copending application, the possibility always exists that the ice, in building up on the coils, will reach a cross-sectional thickness sufficient to block flow of the pure water from the condensing chamber particularly in view of the position of the coils in the bottom of the condensing chamber.

Moreover, the compressor itself will not provide an area for possible reduction in the quantity of excess vapor, because the compressor superheats the vapor. Thus, at all critical stages in the system wherein the excess vapor problem might be solved, other design parameters outweigh modification or adaptation of the design of the condensing chamber, the compressor or the evaporating chamber to solve this problem. It will be appreciated that design changes or modifications downstream of the condensing chamber will not solve the excess vapor problem in the condensing chamber.

A feature of the present invention resides in the provision of means for removing excess vapor from the system which, in addition, produces ice from which the final product, "sweet" water, may be obtained.

In accordance with the present invention, a pre-icing zone is provided in the incoming sea water line 18 for producing ice crystals from a portion of the sea water prior to its introduction into the direct freezing zone, i.e., the evaporating chamber 20. With the present invention, the ice produced in the pre-icing zone causes a reduction in the quantity of sea water available for the production of vapor in the evaporating chamber 20 and increases the amount of ice which may be supplied to the condensing chamber for evaporating the vapor produced in the evaporating chamber and supplied to the condensing chamber 50 under the influence of the compressor 54 from the evaporating chamber 20. It will be appreciated, therefore, that by forming ice from a portion of the sea water before introduction thereof into the evaporating chamber 20, the amount of vapor produced in the evaporating chamber and supplied to the condensing chamber is less than the amount which would be otherwise supplied thereto if formation of ice from the sea water was not effected in the system before introduction of the sea water into the evaporating chamber 20. Therefore, by employment of the present invention wherein an increased quantity of ice is produced which is supplied to the condensing chamber for condensing the reduced quantity of vapor supplied thereto from the evaporating chamber, the system quantities of vapor and ice in the condensing chamber approach the quantities of these substances required to provide thermal balance conditions in the condensing chamber and thus in the system.

It cannot be overemphasized that, in accordance with one aspect of the present invention employing means for forming ice crystals from a portion of the sea water before supply thereof to the evaporating chamber, the product of such means, i.e., the ice, is inert with respect to the desalination system in the sense that the ice may flow through the remainder of the system without harmful effect on the system, and that the ice thus produced, after being washed, is the basis of the desired final product, potable water.

Thus, with the present invention, heat is removed from the system, the excess vapor problem is minimized and, at the same time, an increase in the total quantity of the final product, potable water, is realized without harmful effect on the system and without appreciable increase in energy requirements.

Preferably in the pre-icing zone, the means for producing ice crystals from a portion of the incoming sea water before introduction of the sea water into the evaporating chamber 20 takes the form of an indirect refrigeration device such as that illustrated schematically in FIG. 1 and designated by the numeral 63. Of course, it will be appreciated that direct freezing methods employing a refrigerant such as Freon, isobutane, or butane in intimate contact with the sea water may be employed to form ice crystals from a portion of the incoming sea water in the line 18 so long as the refrigerant vapors are removed prior to introduction of the ice into the condensing chamber 50.

In general, the quantity of ice produced in the incoming sea water in the device 63 will depend upon the temperature of the sea water flowing into the device 63, the temperature and pressure in the device 63 and, the velocity of flow of the sea water through the device 63, in addition to other system parameters. Generally, any refrigeration device 63 which will cause formation of ice in a portion of the incoming sea water flowing through line 18 without producing an excess quantity of vapor, or preferably without the production of vapor, may be utilized in the practice of the present invention.

A representative embodiment of a device 63 found useful in the practice of the present invention appears in FIGS. 1, 3 and 4. The device 63 appearing in these figures is commercially available under the trade name "Pakicer."

Referring to FIG. 3, the device 63 comprises a housing 65 having a horizontally extending inner chamber 67 and a plurality of separate outer chambers 69. The device 63 is supported on a base 71 by stantions 73. The inner chamber 67 has an inlet 75 connected to the conduit 18 adjacent the heat exchanger 16 and an outlet 77 connected to the conduit 18 adjacent the evaporating chamber 20. Thus, sea water flows from the heat exchanger 16 through the inlet 75, through the chamber 67 and from the outlet 77 to the evaporating chamber 20.

The plurality of outer chambers 69 are supplied a fluid refrigerant, such as Freon, from a manifold 79 through couplings 81 and the Freon is discharged from the chambers 69 through couplings 83 into a manifold 85 for recirculation thereof through a conduit 87 (FIG. 4) to the manifold 79.

The inner wall 89 (FIG. 3) of the chambers 69 are corrugated to increase the surface area thereof for maximum exposure to the cooling effect of the refrigerant fluid in the chambers 69.

Axially disposed in the chamber 67 is a rotatable shaft 91 driven by means (not shown). The shaft carries a plurality of rotors 93, such as three rotors, two such rotors being shown in FIG. 3 with one of the rotors being removed from the intermediate section of the chamber 67 to illustrate the recesses 95 in the wall of the chamber 67 formed by the corrugated wall 89. Each of the rotors 93 carry at both of the ends thereof a plurality of rotor knives 97 having scraper fingers 99 thereon which are provided to scrape ice from the recesses 95.

Thus, in the operation of the device 63 the refrigerant in the chambers 69 causes the sea water in chamber 67 adjacent wall 89 to form ice by heat conduction through the wall 89, and the fingers 99 continuously scrape the ice from the recesses 95 in the wall 89. The ice forms an ice sea water mixture with the sea water flowing through the outlet 77. In the operation of the device 63, the refrigerant fluid continuously flows through the chambers 69 and is recirculated through the manifolds 79 and 85.

The mixture of sea water and ice produced in the device 63 is then supplied through the conduit 18 for discharge thereof into the evaporating chamber 20 (FIG. 1). In the evaporating chamber 20 the remaining sea water is flash evaporated and the vapor produced is supplied under the influence of the compressor 54 into the condensing chamber 50 for condensation thereof on ice introduced into the condensing chamber 50 through the conduit 46.

By employment of the device 63, the amount of vapor produced in the evaporating chamber 20 is reduced because of formation of ice from a portion of the sea water, and, therefore, the amount of vapor produced in the evaporation chamber 20 and introduced into the condensing chamber 50 requiring condensation thereof is proportionately reduced. The addition of ice which is produced in the device 63 to the ice produced in the evaporating chamber 20 adds thus to the total amount of final product produced in the system as well as to the amount of ice available for condensation of vapor in the condensing chamber 50. Thus, not only is the problem of excess vapor solved by employment of the present invention including means for producing ice from a portion of the incoming sea water being supplied to the evaporating chamber, but also the quantity of final product produced by the system may be increased proportionally.

It will also be appreciated that the device 63 chills the sea water as it passes therethrough to cool the sea water before its introduction into the evaporation chamber 20. Moreover, the ice crystals produced in the device 63 will serve as seed crystals in the evaporation chamber 20 to enhance and promote ice crystal formation therein.

Attention is turned now to a description of the compressor 54. The motor 120 therefor for driving the compressor is located outside of the condensing chamber 50 so that it will not introduce heat into the system and the drive mechanism between the motor and compressor may be of the type and arrangement disclosed in the copending United States application for patent by Gordon R. Anderson, Serial No. 93,071, filed March 3, 1961, for "Compressor Drive Means," the disclosure of which is hereby incorporated herein by reference. If this drive mechanism is employed, it provides an effective seal for the drive shaft of the compressor, without the use of expensive and elaborate mechanical seals, which are normally required for such high pressure differentials, by allowing leaking of "sweet water" from the motor housing into the compressor. "Sweet water" flowing into the motor housing cools the motor and that portion of the "sweet water" leaking into the compressor flash-evaporates to cool the compressed vapor and to partially reduce the super-heat in the vapor.

In the embodiment of the present invention appearing in FIG. 5 the device 63 is positioned in a fluid flow bypass system in which conduit 18 is connected by a bypass conduit 101 to the inlet 75 of the device 63. The outlet 77 of the device 63 is connected to a conduit 103 which supplies the mixture of sea water and ice produced in the device 63 into the evaporating chamber 20 near the bottom thereof. In this embodiment of the system of the present invention, the major portion of the incoming sea water from the heat exchanger 16 which is not bypassed into conduit 101 is supplied into the top of the evaporating chamber 20 through the conduit 18 for flash evaporation thereof.

In the alternative embodiment of the present invention appearing in FIG. 6, the same general arrangement of the device 63 employed in the system of FIG. 5 is utilized, but, in this arrangement, the brine-ice mixture discharged from the evaporating chamber 20 into line 25 which supplies the mixture into the bottom of the counterwasher 26 is partially converted into ice by the device 63 which is installed in line 25. It will be appreciated that the ice produced in the device 63 in line 25 rather than in line 18 will mix with the ice and brine mixture discharged from the evaporating chamber 20.

In the arrangement of FIG. 6 the ice and sea water mixture from the device 63 and the ice and sea water mixture from the evaporating chamber are mixed to form in the counter-washer 26 a packed ice column. The brine in this mixture, under the influence of the pump 30, is withdrawn through the screen 28 and supplied by conduit 78 through the heat exchanger 16 in heat-exchange relationship with the incoming sea water for pre-cooling of the sea water. The brine solution after passing through the heat exchanger 16 may be then either discharged or utilized, as desired.

It will also be appreciated that, with this arrangement of the present invention, the amount of ice produced, and thus the amount of final product, potable water, produced is increased when compared with a system not employing the device 63.

In addition to a device 63 in either or both of the lines 18 and 25 a device 63 (not shown) may be provided in either or both of lines 42 and 46. Also with such a device 63 in either the fresh water line 42 or line 46, a means is provided for removing heat from the system and thereby provides means for controlling the heat gains and thus the efficiency of the system to some degree.

As previously mentioned, the principal product of the system described is potable water, but, of course, it will be readily appreciated that the concentrated brine could be used for further processing to produce salt, or if other raw products, such as fruit juice, were initially supplied to the system, the concentrated fruit juice delivered from the heat exchanger would be the principal product, and the potable water would be a useful by-product.

It should also be noted that a higher pressure is necessary in the condensing chamber than in the evaporating chamber because the vapor pressure of the freezing brine is lower than the vapor pressure of the ice-water mixture at 32° F. The vapor pressure of the brine of 7 percent by weight salinity at 24.8° F., is about 3.2 mm. Hg, while the vapor pressure of ice-water mixture at 32° F. is about 4.6 mm. Hg. The compressor 54 maintains this operating condition.

It has been found advisable to recirculate a portion of the cold brine from the counter-washer 26 in order to prevent the ice from coming up within the evaporating chamber and thereby plugging the system and stopping continuous operation. Thus, a portion of the cold brine is taken from the counter-washer 26 and is delivered by the pump 30 into the pipe 86 which supplies the brine into the evaporating chamber 20 near the top thereof, as appears in FIG. 1.

This introduction of concentrated brine with the sea water in the evaporating chamber does not interfere adversely with the evaporation and formation of vapor and ice therein, but conversely does prevent ice from building up in the evaporating chamber. In addition, small ice crystals escaping from the drainage area of the column-washer are thus re-introduced into the system to promote crystallization. Also, the greatest amount of ice is present in the ice-brine mixture at the bottom of the evaporating chamber 22 and there is a tendency for ice build-up at that point. However, the introduction of additional brine increases the fluidity of the total mixture and also has a flushing action at the bottom of the evaporating chamber.

In any commercially successful desalination system relatively large volumes of potable water must be produced, and, while this may be effected by building larger and larger equipment, and, within shadow of commercial unacceptance due to high cost, the size of the equipment must be reasonable. With the system, schematically shown on FIG. 1, it is contemplated that approximately 60,000 gallons of potable water per 24-hour day would be produced. Rather than attempt to increase the size of the equipment and thereby add to its expense out of the proportion to gain, it is contemplated that, when larger production of potable water is required, which will normally be the case, separate, but parallel, systems will be installed and operated to supply additional requirements.

As aforesaid, the sweet water, as it leaves the heat exchanger 16 through pipe 80 is the principal product of the arrangements appearing in the drawing and is delivered to a storage tank 82 from which it may be withdrawn from use.

In employing the compressor arrangement of the abovementioned copending application, a portion of the "sweet water" from the tank 82 may be supplied under the influence of a pump 118 through a conduit 119 into the housing of the compressor motor 120 for cooling lubrication of the motor in accordance with the teaching of the aforementioned copending application. To provide a circulation system for cooling and lubricating of the motor an outlet conduit 121 connects the motor housing 120 with the collecting chamber 82 to complete the circuit.

It will also be appreciated that the employment of the present invention in such systems as flash evaporative desalination systems provides means which will promote formation of ice in the evaporating chamber when the system is initially placed in operation and will thereby reduce the time required to initiate operation of the system when compared with a system not employing the present invention.

Although various minor modifications and alterations of the present invention will be readily apparent to those versed in the art, it should be understood that what is desired to be embodied within the scope of the patent warranted hereon are all such embodiments which reasonably and properly fall within the scope of the contribution to the art hereby made.

We claim:

1. In freezing apparatus for separating a solvent in substantially pure form from a liquid solution, indirect heat exchange means including a first chamber for receiving at least a portion of said solution and for removing heat from said portion of said solution and for discharging said heat from the apparatus to produce a frozen solvent from a portion of the liquid solvent in said portion of said solution and leaving a remainder as a second portion of said solution, and direct heat exchange means including a second chamber communicating with said first chamber for receiving at least a portion of said second portion of said solution and for producing frozen solvent from a second portion of the liquid solvent, said direct heat exchange means including a vapor compression means for maintaining a vacuum condition within the direct heat exchange means to evaporate a portion of the solvent portion of the solution and to freeze a remainder portion of the solvent portion of said solution.

2. In apparatus of claim 1, means for separating frozen solvent from said solution, means for washing said frozen solvent, and means for receiving and melting washed frozen solvent.

3. In the apparatus of claim 1, means for separating said frozen solvent from said solution, means for washing said frozen solvent, and means for receiving said washed frozen solvent and said vapor, said receiving means permitting contact of said vapor with said frozen solvent for melting said frozen solvent and for condensing said vapor.

4. In the freezing apparatus for producing potable water from sea water and the like, an indirect heat exchange device including a first chamber for receiving at least a portion of the sea water and for removing heat from said portion of the sea water and for discharging said heat from the apparatus to produce ice from a portion of the water in the sea water and leaving a remainder as a second portion of the sea water, and a vacuum freezing device including a second chamber communicating with said first chamber for receiving at least said second portion of said sea water and for producing ice from a second portion of the water in said second portion of the sea water, said direct heat exchange device including a vapor compressor for maintaining a vacuum condition within the direct heat exchange device to evaporate a portion of the water portion of the sea water and to freeze a remainder portion of the water portion of said sea water.

5. In the apparatus of claim 4, means for separating said ice from said sea water, means for washing said ice, and means for receiving said washed ice and said vapor, said receiving means permitting contact of said vapor with said ice for melting said ice and for condensing said vapor.

6. In the freezing method of separating a solvent in substantially pure form from a liquid solution, the steps comprising passing at least a portion of the solution through indirect heat exchange means for removing heat from said portion of the solution and for producing frozen solvent from a portion of the liquid solvent of said portion of the solution and leaving a remainder as a second portion of said solution, passing at least a second portion of the solution to direct heat exchange means, said direct heat exchange means being operable by establishing and maintaining a vacuum condition within the direct heat exchange means to encourage vaporization of solvent in said second portion to thereby form frozen solvent from said solvent, and melting said frozen solvent to produce liquid solvent.

7. In the freezing method of claim 6, the steps including separating said frozen solvent from said solution, and washing said frozen solvent before it is melted.

8. In the method of claim 7, the step including condensing said vapor of said solvent by contact with said washed frozen solvent.

9. In the freezing method of producing potable water from sea water and the like, the steps comprising passing at least a portion of the sea water through an indirect heat exchange device for removing heat from a portion of the sea water and for producing ice from a portion of the water of said portion of the sea water and leaving a remainder as a second portion of the sea water, passing at least said second portion of the sea water to a direct heat exchange device, said direct heat exchange device including a compressor for establishing and maintaining a vacuum condition within the direct heat exchange device to encourage vaporization of water in said second portion of the sea water to thereby form ice from the water in said second portion of the sea water, and melting said ice to produce liquid water.

10. The method of claim 9 including the steps of separating said ice from said sea water, washing the ice, and moving the washed ice in contact with vapor produced from said sea water in said direct heat exchange device to melt the ice and condense the vapor.

References Cited by the Examiner

UNITED STATES PATENTS

| 2,821,304 | 1/1958 | Zarchin | 62—58 |
| 3,049,889 | 8/1962 | Carfagno | 62—58 |

FOREIGN PATENTS

| 233,676 | 4/1961 | Australia. |
| 985,905 | 3/1951 | France. |
| 806,727 | 12/1958 | Great Britain. |
| 841,374 | 7/1960 | Great Britain. |
| 70,507 | 6/1946 | Norway. |

OTHER REFERENCES

Hendrickson et al.: "Research and Development of Processes for Desalting Water by Freezing," U.S. Department of Interior, Office of Saline Water Research and Development Progress Report No. 10, pages 102, 103 and 104 relied on, August 1956.

Pomona Progress Bulletin, March 10, 1955, article entitled "Pomona Man's Plan Converts Sea Water."

NORMAN YUDKOFF, *Primary Examiner.*